United States Patent
Kuze

[11] 3,777,495
[45] Dec. 11, 1973

[54] THERMAL RESPONSIVE POWER ELEMENT

[76] Inventor: Yoshikazu Kuze, No. 31-3, 1-chome, Magome, Higashi, Ota-ku, Tokyo, Japan

[22] Filed: Feb. 7, 1972

[21] Appl. No.: 223,878

[30] Foreign Application Priority Data
May 28, 1971   Japan............................... 46/26330
Feb. 10, 1971   Japan................................. 46/6472

[52] U.S. Cl................................60/530, 277/171
[51] Int. Cl.......................................... F03g 7/06
[58] Field of Search........................ 60/23; 236/100; 73/395, 419, 363; 277/205, 206

[56] References Cited
UNITED STATES PATENTS
| 984,153 | 2/1911 | Olsen | 73/419 |
| 996,358 | 6/1911 | Olsen | 73/419 |
| 2,832,616 | 4/1958 | Morse | 277/206 |
| 3,427,883 | 2/1969 | Kuze | 236/100 |

Primary Examiner—Martin P. Schwadron
Assistant Examiner—H. Burks, Sr.
Attorney—Richard K. Stevens et al.

[57] ABSTRACT

A thermal responsive power element has a heat sensitive chamber with a guide spool fixedly mounted therein to define an annular space therebetween. The guide spool has an axial bore passing therethrough provided with a self-equipped miniature seal packing at the outer open end portion for an actuating rod slidably guided therein.

A rubber or rubber-like sealing plug is mounted in said bore with one end in contact with one end of said actuating rod. The sealing plug is diverging toward both ends thereby forming a fluid tight seal in the bore. A thermal responsive expansive substance fills the annular space and, upon application of heat, expands, exerting a force on the plug and the actuating rod. The guide spool is provided with a self-equipped miniature seal packing with lips at the outer open end portion of the guide spool.

2 Claims, 10 Drawing Figures

PATENTED DEC 11 1973

PATENTED DEC 11 1973 3,777,495

THERMAL RESPONSIVE POWER ELEMENT

This invention relates to the improved sealing device of the thermal responsive power elements.

One of the object of the present invention is to provide a thermal responsive power element having a high thermal sensibility, a better durability, and a simple form.

Another object of the present invention is to provide a self-equipped miniature seal packing in the outer open end portion of the guide spool, which will bring extraordinary durability to the present invention.

A further object of the present invention is to provide an improved sliding sealing plug which diverges toward its both ends thereof and the bottom of which are convex and are tightly urged sealing engagement with the inner bore of the guide spool, which will bring extraordinary sealing effect.

Other object and advantages will become more readily apparent upon proceeding with the following description and with reference to the accompanying drawings wherein, FIG. 1 is a longitudinal sectional view of a thermal responsive power element according to the present invention before heating;

Figure 1:
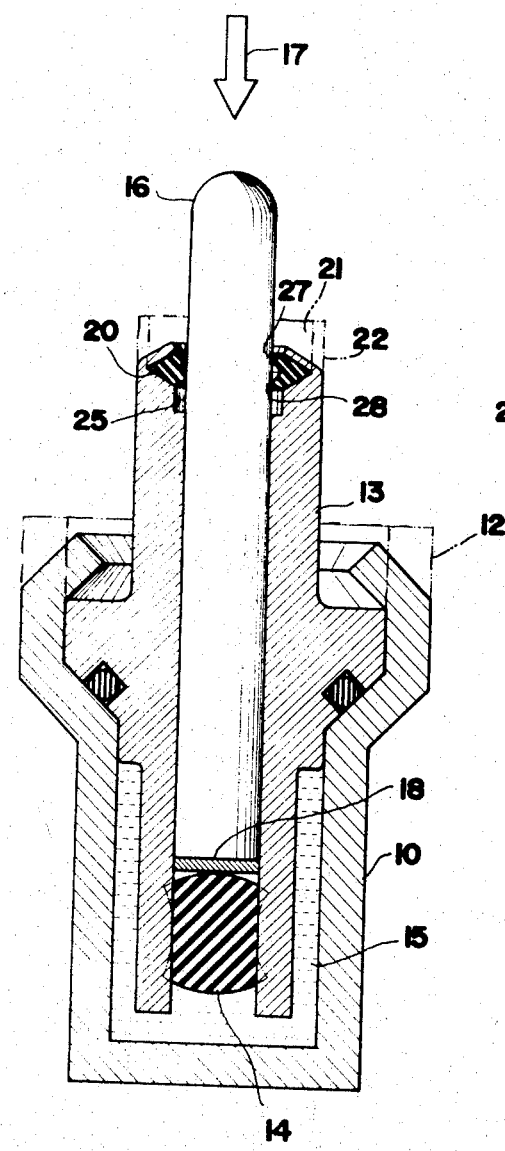
Figure 3:
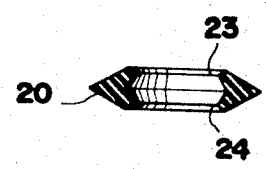
FIG. 3 is a longitudinal sectional view of the seal packing.

In the embodiment of the invention illustrated in FIG. 1, the thermal sensitive chamber 10 has a head portion formed by an outward extending tapered flange 11 and upstanding flange 12. Within the chamber 10 a metallic guide spool 13 is sealingly clamped in position and rigidly secured to the thermal sensitive chamber 10. The metallic guide spool 13 is provided with a centrally located straight opening throughout. A rubber or rubber-like sealing plug 14 is fitted to the central opening in the metallic guide spool 13. A thermal responsive expansible substance 15 is filled between the chamber 10 and the metallic guide spool 13.

Positioned within the longitudinal opening in the metallic guide spool 13 is an actuating rod 16 which extends outwardly upon expansion of the thermal responsive expansible substance 15, the latter acting to move the rubber or rubber-like plug 14 along the inner wall of the metallic guide spool 13 thereby forcing the actuating rod 16 to move outwardly relative to the metallic guide spool 13 against the action of the compression spring force 17. An anti-chafing disk 18, formed of a wear-resistant soft plastic material, is seated on the rubber or rubber-like plug 14 and acts, in turn, as a seat for the innermost end of the actuating rod 16.

Figure 4:
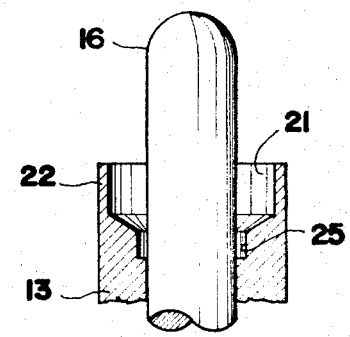
FIGS. 4, 5 and 6 show the progressive steps of self-equipped miniature seal packing at the outer open end portion of the guide spool.
Figure 5:
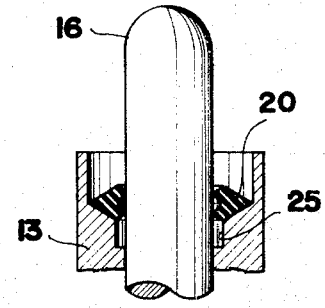
Figure 6:
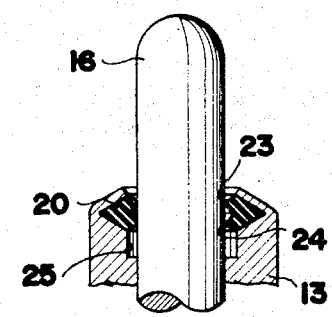
Figure 8:
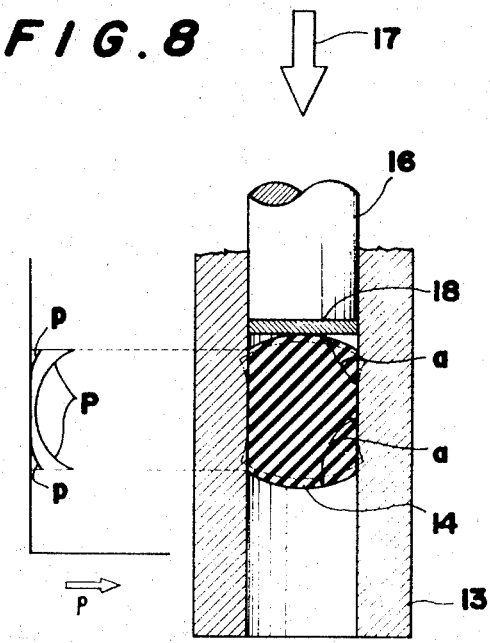
FIG. 8 is a sectional view illustrating the contact pressure distribution between the rubber or rubber-like plug of FIG. 6 and the guide spool.

A miniature seal packing 20 is seated into an annular recess 21 in the outer open end portion in the metallic guide spool 13 and the upstanding thin wall 22 of said metallic guide spool 13 is sealingly clamped in position and serves as a retainer against the miniature seal packing 20. FIGS. 4, 5 and 6 show the progressive steps of self-equipped miniature seal packing in the outer open end portion of the metallic guide spool 13. The lip 23 of the miniature seal packing 20 can prevent any foreign matters from coming in. The lip 24 can keep any lubricant leakage from taking place. The recess 25 is where lubricant is put and lubricates thrust portions at reciprocating of the actuating rod 16 while it receives any lubricant more than needed.

Figure 7:
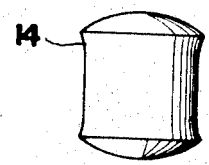
FIG. 7 is a side view of the rubber or rubber-like plug.
Figure 2:
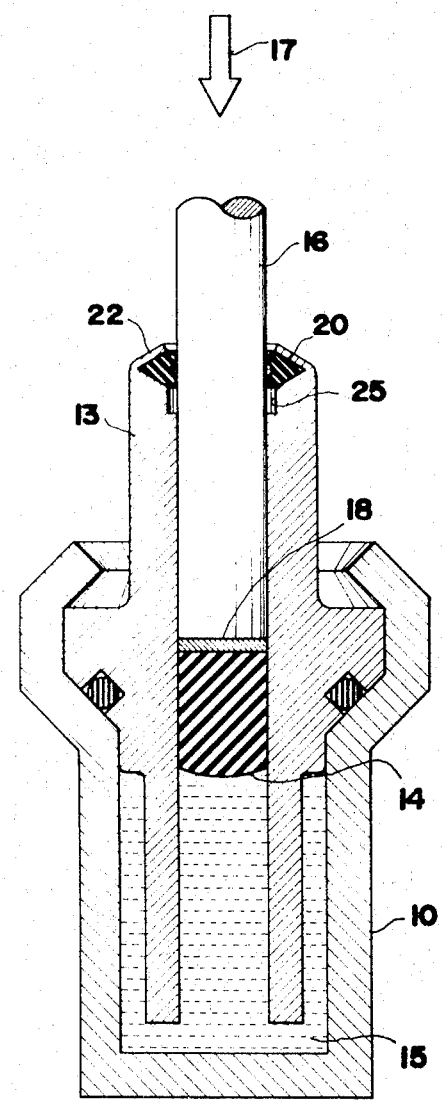
FIG. 2 is a longitudinal sectional view of a thermal responsive power element according to the present invention after heating.

It will be noted that the rubber or rubber-like plug 14, (FIG. 6) which diverges toward the both ends thereof is constantly urged into sealing engagement with the inner wall of the metallic guide spool 13 by means of the contact pressure created at the contact face between the rubber or rubber-like plug 14 and the inner wall of the metallic guide spool 13. As shown in FIG. 7, the contact pressure p has a sharp peak near the side where said rubber or rubber-like plug 14 is in contact with the thermal responsive expansible substance 15 and the innermost end of the actuating rod 16. Thus assuring the formation of a positive fluid-tight seal at these two contact face between the rubber or rubber-like plug 14 and the inner wall of the metallic guide spool 13.

The both ends of the rubber or rubber-like plug 14 is formed convex so that contact angle a (FIG. 7) of the plug 14 relative to the inner wall of the metallic guide member in an obtuse angle. This obtuse contact angle will increase the durability of the rubber or rubber-like plug and by this obtuse contact angle, the rubber or rubber-like plug 14 will move smoothly when the sealing plug 14 is reciprocated.

It will be noted that the thermal sensitive power element may be functionally divided into two broad classes. That is ;

I. small stroke of an actuating rod against wide temperature range.

II. large stroke of an actuating rod against narrow temperature range.

The former uses thermally expansive liquid and the latter uses the wax or wax-like substance.

Now referring to the thermal sensitive power element using thermally sensitive liquid, upon application of heat to the thermal sensitive power element, the thermally expansive liquid expands to exert a force on the lower end of the rubber or rubber-like sealing plug 14 to push the actuating rod 16 outwardly relative to the metallic guide spool 13 against the action of the compressive spring force 17.

The contact pressure created at the contact face between the rubber or rubber-like sealing plug 14 and the inner wall of the metallic guide spool 13 will be added to the pressure of the expansive liquid so that the resultant contact pressure P turn large value and no liquid will occur between the sealing plug 14 and the metallic guide spool 13.

If the ambient temperature is decreased, the temperature of the liquid is likewise reduced thereby effecting a reduction in volume. The actuating rod 16 will be withdrawn into the metallic guide spool 13 by compression spring force 17.

Thus the rubber or rubber-like sealing plug 14 reciprocates relative to the inner bore of the metallic guide spool 13 according to the ambient temperature. Then, the rubber or rubber-like sealing plug 14, in form of column, is reciprocated through inner bore of the metallic guide spool 13 holded between the actuating rod 16 and the thermal expansive liquid 15. The rubber or rubber-like sealing plug 14 taking a fixed form of a column, keeps the same deformation irespective of quantity of its stroke. And the rubber or rubber-like sealing plug 14 are convex at its both ends to form an obtuse contact angle relative to the inner wall of the metallic guide spool 13 whereby the rubber or rubber-like sealing plug 14 will reciprocate smoothly in the metallic guide spool.

Thus the present invention can move smoothly and is operable in temperature range order of −20° to +80°C.

Figure 9:
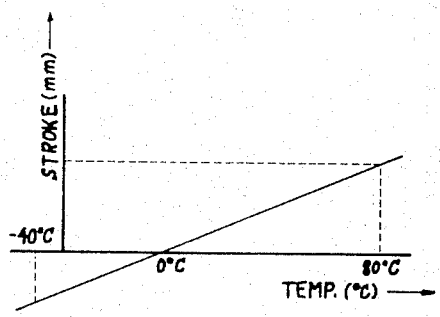
FIG. 9 shows the characteristic curve for liquid.

FIG. 9 shows the characteristic curve of temperature against the stroke of an actuating rod for liquid. The temperature is in direct proportion to the stroke of an actuating rod.

Next, referring to the thermal sensitive power element using wax or wax-like substance, this is an utilization of high volumetric expansion qualities being resulted from the change of state from solid to liquid through heat.

Except the use of the wax or wax-like substance in place of liquid, the operation and the function are the same as above mentioned thermal responsive element using liquid.

Figure 10:
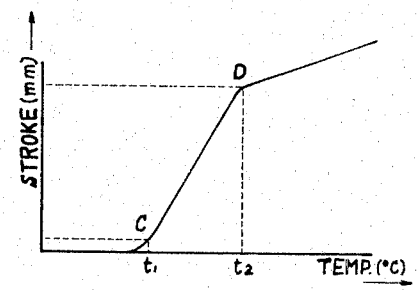
FIG. 10 shows the characteristic curve for wax.

FIG. 10 shows the characteristic curve of temperature against stroke of an actuating rod for wax.

What is claimed is:

1. A thermal responsive power element comprising a thermal conductive chamber, a metallic guide spool having a straight axial bore passing therethrough, said metallic guide spool being fixedly mounted in said chamber and defining an annular space therebetween, an actuating rod slidably mounted in said bore, a rubber or rubber-like sealing plug mounted in said bore with one end in contact with one end of said actuating rod, said sealing plug being convex at both its ends to form an obtuse contact angle between said sealing plug and the inner wall of the guide member, whereby the sealing plug will move smoothly in said metallic guide spool and the durability of said sealing plug will be increased and a fluid-tight seal is formed between said plug and said guide member; a second miniaturized sealing means in the opposite end of said spool, said second means having an upper and a lower annular lip, said lips projecting generally inwardly in the direction of said bore and defining an intervening annular cavity, said seal being clamped into sealing position by the outer walls of said spool being overturned inwardly thereupon; a thermally responsive expansible substance sealed within said annular space in communication with said plug whereby, upon application of heat to said thermally responsive power element, said expansible substance expands to exert a force on the lower end of said sealing plug to thus push said actuating rod from the bore in said guide means.

2. A thermal responsive power element as claimed in claim 1 in which an annular recess is provided immediately adjacent and below said second sealing means which reservoirs a lubricant oil and lubricates during reciprocating of the actuating rod.

* * * * *